(12) United States Patent
Deininger et al.

(10) Patent No.: US 6,703,475 B1
(45) Date of Patent: Mar. 9, 2004

(54) METHOD FOR THE CONTINUOUS PRODUCTION OF COPOLYAMIDES BASED ON A LACTAM (I), A DIAMINE (II) AND A DICARBOXYLIC ACID (III)

(75) Inventors: Jürgen Deininger, Oftersheim (DE); Walter Götz, Ludwigshafen (DE); Alfons Ludwig, Höxter (DE); Gunter Pipper, Bad Dürkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 7 days.

(21) Appl. No.: 10/130,044

(22) PCT Filed: Nov. 15, 2000

(86) PCT No.: PCT/EP00/11277

§ 371 (c)(1),
(2), (4) Date: May 13, 2002

(87) PCT Pub. No.: WO01/40355

PCT Pub. Date: Jun. 7, 2001

(30) Foreign Application Priority Data

Nov. 30, 1999 (DE) .......................................... 199 57 663

(51) Int. Cl.$^7$ .......................... C08G 69/04; C08G 69/16
(52) U.S. Cl. ...................... 528/310; 528/322; 528/323; 528/312; 528/324; 528/332; 528/335; 528/336; 528/480; 528/499
(58) Field of Search ................................ 528/310, 312, 528/323, 324, 322, 332, 335, 336, 499, 480

(56) References Cited

U.S. PATENT DOCUMENTS

| | | | |
|---|---|---|---|
| 3,893,981 A | * 7/1975 | Thoma et al. ............... 528/324 |
| 3,932,366 A | * 1/1976 | Thoma et al. ............... 525/426 |
| 4,053,457 A | 10/1977 | Cordes | |
| 4,465,821 A | 8/1984 | Nielinger | |
| 4,963,646 A | 10/1990 | Galland | |
| 5,039,786 A | 8/1991 | Pipper | |
| 5,223,196 A | 6/1993 | Shridharani et al. | |
| 5,674,973 A | * 10/1997 | Pipper et al. ................ 528/323 |
| 5,959,069 A | * 9/1999 | Gluck et al. ................. 528/332 |
| 6,320,021 B1 | * 11/2001 | Hildenbrand et al. ........ 528/499 |
| 6,326,457 B1 | * 12/2001 | Erbes et al. ................. 528/310 |
| 6,429,279 B1 | * 8/2002 | Hunger et al. .............. 528/310 |

FOREIGN PATENT DOCUMENTS

| | | |
|---|---|---|
| DE | 110 507 | 12/1974 |
| EP | 345 648 | 12/1989 |

* cited by examiner

*Primary Examiner*—P. Hampton Hightower
(74) *Attorney, Agent, or Firm*—Keil & Weinkauf

(57) ABSTRACT

A process for continuous production of copolyamides based on a lactam (I), a diamine (II) and a dicarboxylic acid (III) comprises reacting a mixture (IV) comprising a diamine (II), a dicarboxylic acid (III) and water in a first reaction zone at a pressure in the range from $1.3*10^5$ to $2.5*10^5$ Pa in the entry zone of the reaction zone and at a temperature above the melting point of polymer (V) to a conversion, based on the molar amounts of diamine (II) and dicarboxylic acid (III), of at least 80% to form a polymer (V), reacting a mixture (VI) comprising lactam (I) and water in a second reaction zone at a pressure in the range from $5*10^5$ to $40*10^5$ Pa and at a temperature above the melting point of polymer (VII) to a conversion, based on the molar amount of lactam (I), of at least 80% to form a polymer (VII), then reacting polymer (V) and polymer (VII) with each other in a third reaction zone at a pressure in the range from $1*10^5$ to $1.5*10^5$ Pa in the entry zone of the reaction zone at temperatures above the melting point of polymer (VIII) to form a polymer (VIII), said polymer (VIII) having a 95° C. water extractables content, based on lactam (I), diamine (II) and dicarboxylic acid (III), of not more than 10% by weight, and then extracting the polymer (VIII) with water to obtain the copolyamide.

15 Claims, No Drawings

METHOD FOR THE CONTINUOUS PRODUCTION OF COPOLYAMIDES BASED ON A LACTAM (I), A DIAMINE (II) AND A DICARBOXYLIC ACID (III)

DESCRIPTION

The present invention relates to a process for continuous production of copolyamides based on a lactam (I), a diamine (II) and a dicarboxylic acid (III), which comprises reacting a mixture (IV) comprising a diamine (II), a dicarboxylic acid (III) and water in a first reaction zone at a pressure in the range from $1.3*10^5$ to $2.5*10^5$ Pa in the entry zone of the reaction zone and at a temperature above the melting point of polymer (V) to a conversion, based on the molar amounts of diamine (II) and dicarboxylic acid (III), of at least 80% to form a polymer (V), reacting a mixture (VI) comprising lactam (I) and water in a second reaction zone at a pressure in the range from $5*10^5$ to $40*10^5$ Pa in the entry zone of the reaction zone and at a temperature above the melting point of polymer (VII) to a conversion, based on the molar amount of lactam (I), of at least 80% to form a polymer (VII), then reacting polymer (V) and polymer (VII) with each other in a third reaction zone at a pressure in the range from $1*10^5$ to $1.5*10^5$ Pa in the entry zone of the reaction zone at temperatures above the melting point of polymer (VIII) to form a polymer (VIII), said polymer (VIII) having a 95° C. water extractables content, based on lactam (I), diamine (II) and dicarboxylic acid (III), of not more than 10% by weight, and then extracting the polymer (VIII) with water to obtain the copolyamide.

The present invention further relates to copolyamides obtainable by this process, to their use for producing fibers, sheetlike structures and shaped articles, and to fibers, sheetlike structures and shaped articles based on the copolyamides.

Processes for continuous production of copolyamides from lactams, such as caprolactam, and equimolar amounts of diamines and dicarboxylic acids, such as hexamethylene adipate ("66 salt"), are common knowledge.

DD 110 507 describes such a process where caprolactam, 66 salt and water are fed to the top of a vertical column reactor (VK tube) and polymerized in the tube at elevated temperature and elevated pressure by passing the reaction material downwardly through the tube, and at the same time removing the corresponding copolyamide at the bottom end of the tube one disadvantage with this process is that vapors escape at the top of the VR tube; this makes it difficult to obtain a consistent high product quality, since the vapors also carry out diamine and, moreover, precise temperature control in the top region of the VK tube is made difficult. In addition, only a small amount of heat can be introduced into the reaction system via the top of the VK tube, so that only small amounts of diamine and dicarboxylic acid become incorporated in the copolyamide in this process. Another disadvantage of the process is that long residence times of about 19 hours are needed for the reaction mixture in the VK tube in order to obtain economical conversions and copolyamides having marketable product properties.

EP-A-0 098 412 discloses a process for the production of copolyamides. In this process, to avoid the reaction material solidifying as a result of the evaporation of the water of reaction, an aqueous 66 salt solution is continuously added at atmospheric pressure to an appropriate prepolymer melt, the temperature of which should never be less than a certain minimum value, and the water is distilled off at the same time. The continuously removed melt is further condensed at atmospheric pressure in a conventional manner. This process likewise has the disadvantage of the maintenance of a constant temperature in the face of the evaporation of the water of reaction. In addition, the precondensation gives rise to losses of diamine, so that a consistent high product quality is difficult to achieve in this process too.

EP-A-0 393 546 discloses a process wherein an aqueous solution of equimolar amounts of a diamine and of a dicarboxylic acid is passed through a tubular reactor at slightly elevated pressure and with concurrent evaporation of water to form a vapor phase and a prepolymer. The prepolymer melt is subsequently mixed with molten caprolactam and passed downwardly through a VK tube to form a copolyamide. The vapors formed at the entrance to the VK tube are separated in a distillation column by removing water vapor via the top of the column and recycling an aqueous diamine solution into the polymerization. One disadvantage with this process is the low flexibility with regard to the production of copolyamides of different morphologies, ie. the distribution of units based on caprolactam and of units based on diamine and dicarboxylic acid within the copolyamide, for the same gross composition. In addition, the process, which requir s VK tube residence times of 8 to 14 hours, provides only a low space-time yield.

It is an object of the present invention to provide a process for continuous production of copolyamides based on lactam, diamine and dicarboxylic acid whereby such copolyamides are producible in a technically simple and economical manner while avoiding the disadvantages mentioned.

We have found that this object is achieved by the process defined at the beginning, by copolyamides obtainable by this process, by the use of such copolyamides for producing fibers, sheetlike structures and shaped articles, and by fibers, sheetlike structures and shaped articles based on such copolyamides.

The lactam (I) may in principle be—used singly or mixed—any lactam, ie. any cyclic compound having at least one amide group in the cycle, or any aminocarboxylic acid, ie. any compound having both at least one amino group and at least one carboxyl group.

Preferred aminocarboxylic acids are omega-aminocarboxylic acids, especially omega-aminocarboxylic acids having 4 to 12 carbon atoms, more preferably 4 to 9 carbon atoms, in the alkyl moiety, or an aminoalkylaryl carboxylic acid having 8 to 13 carbon atoms in the alkyl moiety, in which case preference is given to those which have an alkylene group of at least one carbon atom between the aromatic unit and the amino and carboxyl group. Especially preferred aminoalkylarylcarboxylic acids are those which have the amino group and carboxyl group in the 1,4 position relative to each other.

Any omega-aminocarboxylic acid used is more preferably a linear omega-aminocarboxylic acid in which the alkylene moiety ($-CH_2-$) preferably contains 4 to 14, more preferably 4 to 9, carbon atoms, such as 4-amino-1-butanecarboxylic acid, 5-amino-1-pentanecarboxylic acid, 6-amino-1-pentanecarboxylic acid (6-aminocaproic acid), 7-amino-1-hexanecarboxylic acid, 8-amino-1-heptanecarboxylic acid, 9-amino-1-octanecarboxylic acid, 10-amino-1-nonanecarboxylic acid, particularly preferably 6-aminocaproic acid.

Where such aminocarboxylic acids are capable of forming lactams through formation of a cyclic, preferably internal, amide, the use of such lactams is an advantageous option, more preference being given to the use of lactams of linear omega-aminocarboxylic acids whose alkylene moiety (—$CH_2$—) preferably contains 4 to 14, more preferably 4 to 9, carbon atoms, such as the lactam of 4-amino-1-butanecarboxylic acid, of 5-amino-1-pentanecarboxylic acid, of 6-amino-1-pentanecarboxylic acid (caprolactam), of 7-amino-1-hexanecarboxylic acid, of 8-amino-1-heptanecarboxylic acid, of 9-amino-1-octanecarboxylic acid, of 10-amino-1-nonanecarboxylic acid, particularly preferably caprolactam.

It will be appreciated that it is also possible to use mixtures of a plurality of lactams, a plurality of aminocarboxylic acids or mixtures of one or more lactams with one or more aminocarboxylic acids.

If desired, it is also possible to use lactams or aminocarboxylic acids derived from branched alkylene—or arylene—or alkylarylenes.

The diamine (II) may in principle be—used singly or mixed—any diamine, ie. any compound having at least two amino groups, such as aromatic amines, for example 1,4-phenylenediamine or 4,4'-diaminodiphenylpropane, or aliphatic amines. Preferred aliphatic amines are the alpha, omega-diamines, especially alpha,omega-alkylenediamines having 3 to 14 carbon atoms, more preferably 3 to 10 carbon atoms, in the alkylene moiety, or alkylaryldiamines having 9 to 14 carbon atoms in the alkyl moiety, preferred alkylaryldiamines being alkylaryldiamines which have an alkylene group of at least one carbon atom between the aromatic unit and the two amino groups, such as p-xylylenediamine or preferably m-xylylenediamine.

The alpha,omega-diamines used are preferably linear alpha,omega-diamines in which the alkylene moiety (—$CH_2$—) preferably contains 3 to 14, more preferably 3 to 10, carbon atoms, such as 1,3-diaminopropane, 1,4-diaminobutane, 1,5-diaminopentane, 1,6-diaminohexane (hexamethylenediamine, HMD), 1,7-diaminoheptane, 1,8-diaminooctane, 1,9-diaminononane, 1,10-diaminodecane, particularly preferably hexamethylenediamine.

Hexamethylenediamine is obtainable in a conventional manner by double catalytic hydrogenation of the nitrile groups of adiponitrile.

It will be appreciated that it is also possible to use mixtures of a plurality of diamines.

If desired, it is also possible to use diamines derived from branched alkylene—or arylene—or alkylarylenes, such as 2-methyl-1,5-diaminopentane.

The dicarboxylic acids (III) may in principle be—used singly or mixed—any dicarboxylic acid, ie. any compound having at least two carboxyl groups. Preferred dicarboxylic acids are the alpha,omega-dicarboxylic acids, especially alpha,omega-alkylenedicarboxylic acids having 3 to 14 carbon atoms, more preferably 3 to 12 carbon atoms, in the alkylene moiety, or an aromatic $C_8$-$C_{12}$-dicarboxylic acid such as isophthalic acid, especially terephthalic acid, and also a $C_5$-$C_8$-cycloalkanedicarboxylic acid such as cyclohexanedicarboxylic acid.

The alpha,omega-dicarboxylic acids used are more preferably linear alpha,omega-dicarboxylic acids in which the alkylene moiety (—$CH_2$—) preferably contains 2 to 14, more preferably 3 to 12, carbon atoms, such as ethane-1,2-dicarboxylic acid (succinic acid), propane-1,3-dicarboxylic acid (glutaric acid), butane-1,4-dicarboxylic acid (adipic acid), pentane-1,5-dicarboxylic acid (pimelic acid), hexane-1,6-dicarboxylic acid (suberic acid), heptane-1,7-dicarboxylic acid (azelaic acid), octane-1,8-dicarboxylic acid (sebacic acid), nonane-1,9-dicarboxylic acid, decane-1,10-dicarboxylic acid, particularly preferably adipic acid.

Adipic acid is obtainable in a conventional manner by oxidation of cyclohexane.

It will be appreciated that it is also possible to use mixtures of a plurality of dicarboxylic acids.

If desired, it is also possible to use dicarboxylic acids derived from branched alkylene—or arylene—or alkylarylenes.

The molecular ratio of diamine and dicarboxylic acid in mixture (IV), mixture (VI), insofar as mixture (VI) includes diamine (II) and dicarboxylic acid (III), and the copolyamide obtainable according to the invention—the quantitative statements which follow taking diamine to be the sum total of diamine (II) and any diamine equivalents, ie. compounds which react like a diamine under the process conditions of the invention, used, and taking dicarboxylic acid to be the sum total of dicarboxylic acid (III) and any dicarboxylic acid equivalents, ie. compounds which react like a dicarboxylic acid under the process conditions of the invention, used, such as dinitriles—should advantageously be in the range from 0.8 to 1.2, preferably from 0.95 to 1.05, particularly preferably from 0.98 to 1.02 (equimolar).

According to the invention, mixture (IV) includes a diamine (II) and a dicarboxylic acid (III), all diamines (II) and dicarboxylic acids (III) being usable together. Preferred combinations of diamine (II) and dicarboxylic acid (III) are the combinations of hexamethylenediamine with adipic acid (66 salt), hexamethylenediamine with sebacic acid, hexamethylenediamine with isophthalic acid, hexamethylenediamine with isophthalic acid and terephthalic acid, m-xylylenediamine with adipic acid, preferably hexamethylenediamine with adipic acid.

According to the invention, mixture (IV) is an aqueous solution of diamine (II) and dicarboxylic acid (III). Advantageously the amount of the sum total of diamine (II) and dicarboxylic acid (III) in the mixture (IV) should be in the range from 30 to 70% by weight, especially from 50 to 65% by weight.

Mixture (IV) may further include a lactam (I) subject to the proviso that the molar amount of lactam (I) in the mixture (IV) is less than the molar amount of lactam (I) in the mixture (VI). Advantageously, mixture (IV) includes up to 20% by weight, especially up to 15% by weight, of lactam (I) based on mixture (IV).

Mixture (VI) may further include a diamine (II) and a dicarboxylic acid (III) subject to the proviso that the molar amount of diamine (II) and dicarboxylic acid (III) in the mixture (VI) is less than the molar amount of diamine (II) and dicarboxylic acid (III) in the mixture (IV). Advantageously mixture (VI) includes up to 15% by weight, especially up to 10% by weight, in total of diamine (II) and dicarboxylic acid (III) based on mixture (VI). Particularly preferably, mixture (VI) does not additionally include a diamine (II) and a dicarboxylic acid (III).

It is particularly advantageous for mixture (IV) to additionally include lactam (I) while mixture (VI) does not additionally include dimine (II) and dicarboxylic acid. (III).

According to the invention, a mixture (IV) is reacted at a pressure in the range from $1.3*10^5$ to $2.5*10^5$ Pa, preferably from $1.35*10^5$ to $1.5*10^5$ Pa, in the entrance to the reaction zone and at a temperature above the melting point of polymer (V) in the range from 250 to 350° C., preferably from 255 to 285° C., to a conversion, based on the molar amounts of diamine (II) and dicarboxylic acid (III), of at least 80%, especially 86 to 96%, in a first reaction zone.

The reaction times should advantageously be in the range from 40 to 600 seconds.

To this end, mixture (IV) may be reacted in reactors known per se for polymerizations, preferably tubular reactors.

The internal cross sections of the tubular reactors may be round or periodically recurringly round and slot-shaped. Reaction times in such reactors may range in particular from 40 to 120 seconds.

The tubular reactors may contain packings, such as ordered internals or loose beds, for example static mixers, packing elements, Raschig rings, Pall rings, especially woven fabric rings preferably from wire net. Such packings may be used to enlarge the internal surface area of the reactor.

The reaction times in such reactors may range in particular from 180 to 600 seconds.

Generally the first reaction zone produces a two-phase mixture of a liquid phase comprising polymer (V) and a gas phase comprising water. The gas phase is advantageously separated from the liquid phase downstream of the first reaction zone.

Generally the gas phase, as well as water, will include unconverted starting compounds and polymer aerosols. After condensation of the gas phase, preferably after subsequent concentrating of the thusly obtained liquid phase in water and a solution of the starting compounds in a conventional manner, for example by extraction, preferably distillation, advantageously in columns, such as packed columns, bubble cap plate columns or sieve plate columns, the columns advantageously having 5 to 15 theoretical plates, the solution which includes the starting compounds may be reused for preparing polymers, for example by recycling into the first or second reaction zone of the process according to the invention.

The polymer (V) obtained downstream of the first reaction zone generally has a water content of not more than 2% by weight, especially not more than 0.5% by weight.

The relative viscosity of polymer (V), determined in 1% solution in 96% sulfuric acid at 23° C., is advantageously from 1.2 to 1.3. The polymer preferably has a carboxyl end group content of from 300 to 350 mmol/kg. The amino end group content is advantageously from 300 to 350 mmol/kg.

According to the invention, a mixture (VI) is reacted in a second reaction zone at a pressure in the range from $5*10^5$ to $40*10^5$ Pa, preferably $15*10^5$ to $25*10^5$ Pa, and at a temperature above the melting point of polymer (VII) to a conversion, based on the molar amount of lactam (I), of at least 80%, preferably at least 85%, especially at least 87%. The reaction times should advantageously be in the range from 0.2 to 3 hours, especially from 0.2 to 2 hours.

To this end, mixture (VI) can be reacted in reactors known per se for polymerizations, preferably tubular reactors.

The tubular reactors may advantageously contain ordered mixing elements, such as Sulzer packings, or random mixing elements, such as packing elements, for example Raschig rings, balls or Pall rings.

The temperature of the reaction mixture should advantageously be such that the reaction mixture forms a single liquid phase during the reaction. At the point of entry of mixture (VI) into the second reaction zone the temperature is advantageously in the range from 230 to 310° C., especially from 240 to 290° C.

The usually exothermic reaction of mixture (VI) to form the polymer (VII) may raise the temperature of the reaction mixture, contemplated temperature increases ranging from 10 to 50° C.

The reaction mixture leaving the second reaction zone may then with advantage be adiabatically decompressed, advantageously to a final pressure from $1*10^5$ Pa to $1.5*10^5$ Pa, preferably from $1.05*10^5$ Pa to $1.1*10,5$ Pa.

This adiabatic decompression is generally accompanied by the evaporation of the water present in the reaction mixture. This will cool the reaction mixture. The temperature of the reaction mixture following adiabatic decompression is customarily from 220 to 300° C., preferably from 230 to 270° C.

Generally the water obtained in the course of the adiabatic evaporation includes unconverted starting compounds, polymer aerosols and oligomers. After condensation of the gas phase, preferably after subsequent concentrating of the thuswise obtained liquid phase in water and a solution of the starting compounds, polymer aerosols and oligomers in a conventional manner, for example by extraction, preferably distillation, advantageously in columns, such as packed columns, bubble cap plate columns or sieve plate columns, the columns advantageously having 5 to 15 theoretical plates, the solution which includes the starting compounds, polymer aerosols and oligomers may be reused for preparing polymers, for example by recycling into the first or second reaction zone of the process according to the invention.

The invention comprises reacting polymer (V) and polymer (VII) with each other in a third reaction zone at temperatures above the melting point of polymer (VIII) to obtain a polymer (VIII), said polymer (VIII) having a 95° C. water extractables content, based on lactam (I), diamine (II) and dicarboxylic acid (III), of not more than 10% by weight.

The reaction times should advantageously be in the range from 3 to 8 hours, preferably from 5 to 6 hours.

The tepperatures should advantageously be in the range from 240 to 285° C., preferably from 250 to 280° C.

Advantageously polymer (V) and polymer (VII are intensively mixed with each other in a conventional manner, such as by stirring, prior to the reaction.

The reaction of polymer (V) with polymer (VII) to form polymer (VIII) may be carried out in reactors known per se for polymerizations, preferably tubular reactors, in which case the tubular reactor is preferably disposed vertically. In this case, the mixture of polymer (V) with polymer (VII) may be fed at the bottom, preferably at the top end of the reactor.

The polymer (VIII) obtained downstream of the third reaction zone has a relative viscosity, determined in 1% solution in 96% sulfuric acid at 23° C., of preferably from 2.0 to 3.0. The amount of 95° C. water extractables is from 3.5 to 10% by weight, preferably from 5 to 8% by weight, based on polymer (VIII). The level of triamines is generally less than 0.06% by weight based on polymer (VIII).

Polymer (VIII) which is liquid downstream of the third reaction zone may be further processed in a conventional manner, for example cast into strands, solidified and pelletized.

According to the invention, polymer (VIII) is subsequently extracted, preferably with water. The temperature range from 80 to 120° C. is advantageous for this.

The solution obtained in this extraction generally has an organics content of from 4 to 15% by weight. The organics content may with advantage be subsequently concentrated to 60 to 90% by weight, especially 75 to 85% by weight, in a conventional manner, for example by distilling the solvent off in a single- or multi-stage distillation plant.

It is advantageous to add lactam (I) to the solution prior to the concentrating. This significantly reduces the precipitation of lactam oligomers during the concentrating.

It is likewise advantageous to add lactam (I) during the extraction of polymer (VIII). This can improve the extraction performance. It is advantageous for the ratio of added amount of lactam to pure extract to be in the range from 0.1 to 4, preferably from 0.5 to 1, based on the extract. Such a process is described in DE-A-25 01 348 for example.

The solution obtained in the extraction may (preferably after concentrating) subsequently be used for polymerization, for example by recycling into the first or second reaction zone of the process according to the invention.

The copolyamide obtained after the extraction is then generally dried in a conventional manner.

Advantageously this may be accomplished using inert gases, such as nitrogen or superheated steam, as heat media, for example in countercurrent. In the process, the desired viscosity, determined in 1% solution in 96% sulfuric acid at 23° C., may be obtained by heat treatment at elevated temperature, preferably at from 150 to 185° C.

Furthermore, the process of the invention may also include a step of chain extension, chain regulation or a branching or a combination of two or three such measures. To this end, substances known to one skilled in the art for branching, chain regulating or chain extending polymers, such as monofunctional amines or carboxylic acids or tri-functional amines or carboxylic acids, for example propionic acid, acetic acid, benzoic acid or triacetonediamdne, or di- or trifunctional isocyanates, such as toluene 2,4-diisocyanate (TDI), toluene 2,6-diisocyanate (TDI), 4,4'-methylenediphenyl diisocyanate (MDI), 2,4'-methylenediphenyl diisocyanate (MDI), p-phenylene diisocyanate (PDI), naphthalene 1,5-diisocyanate (NDI), 1,6-hexamethylene diisocyanate (HDI), isophorone diisocyanate (IPDI), 4,4'-dicyclohexylmethane diisocyanate ($H_{12}$MDI), 1,4-cyclohexane diisocyanate (CHDI), bis(isocyanatomethyl)cyclohexane ($H_6$XDI, DDI), tetramethylxylylene diisocyanate (TMXDI), triphenylmethane triisocyanate, may be used before, in or after the individual reaction stages. Such compounds and their use are described for example in EP-A-0 345 648.

Similarly, additives and fillers known for thermoplastic polymers, especially polyamides, may be used before, in or after the individual reaction stages—such as pigments, dyes, stabilizers, impact modifiers, processing aids, oxidation retarders, agents against thermal decomposition by ultraviolet light, lubricating and demolding agents, flame retardants, plasticizers. They generally comprise up to 40% by weight, preferably up to 15% by weight, based on the total weight of the composition.

The process of the invention is notable for high flexibility and a good space-time yield and permits the controlled production of copolyamides having different morphologies, the copolyamides of the invention combining good transparency and a high DSC melting point with an equimolar end group content, ie. an equal molar number of acid and amino end groups.

Particular preference is given to such copolyamides containing from 70 to 95% by weight, especially from 80 to 90% by weight, based on copolyamide, of nylon-6 units.

These copolyamides are useful for producing fibers, monofilaments, sheetlike structures, such as films, or shaped articles. The shaped articles are obtainable for example by injection molding or extrusion.

We claim:

1. A process for continuous production of copolyamides based on a lactam (I), a diamine (II) and a dicarboxylic acid (III), which comprises
    a) preparing a polymer (V) in a first reaction zone by reacting a mixture (IV) comprising a diamine (II), a dicarboxylic acid (III), water, and a lactam (I), at a pressure of from $1.3*10^5$ to $2.5*10^5$ Pa in the entry zone of the reaction zone and at a temperature above the melting point of the polymer (V) to a conversion, based on the molar amounts of diamine (II) and dicarboxylic acid (III), of at least 80%,
    b) preparing a polymer (VII) in a second reaction zone by reacting a mixture (VI) comprising lactam (I), water, a diamine (II) and a dicarboxylic acid (III) at a pressure of from $5*10^5$ to $40*10^5$ Pa and at a temperature above the melting point of the polymer (VII) to a conversion, based on the molar amount of lactam (I), of at least 80%, with the proviso that the molar amount of lactam (I) in said mixture (IV) is less than the molar amount of lactam (I) in the mixture (VI), and with the proviso that the molar amount of diamine (II) and dicarboxylic acid (III) in said mixture (VI) is less than the molar amount of diamine (II) and dicarboxylic acid (III) in the mixture (IV), and then
    c) preparing a polymer (VIII) in a third reaction zone by reacting the polymer (V) and the polymer (VII) with each other at a pressure of from $1*10^5$ to $1.5*10^5$ Pa in the entry zone of the reaction zone and at temperatures above the melting point of the polymer (VIII), said polymer (VIII) having a 95° C. water extractables content, based on lactam (I), diamine (II) and dicarboxylic acid (III), of not more than 10% by weight, and
    d) extracting the polymer (VIII) with water to obtain the copolyamide.

2. A process as claimed in claim 1, wherein lactam (I) is caprolactam.

3. A process as claimed in claim 1, wherein diamine (II) is hexamethylenediamine.

4. A process as claimed in claim 1, wherein dicarboxylic acid (III) is adipic acid.

5. A process as claimed in claim 1, wherein diamine (II) and dicarboxylic acid (III) are used in equimolar amounts.

6. The process of claim 1, wherein the diamine (II) and the dicarboxylic acid (III) constitute from 30 to 70% by weight of the mixture (IV).

7. The process of claim 1, wherein the diamine (II) and the dicarboxylic acid (III) constitute from 50 to 65% by weight of the mixture (IV).

8. The process of claim 6 wherein the mixture (IV) comprises the diamine (II) and the dicarboxylic acid (III) in a molar ratio of from 0.8 to 1.2.

9. The process of claim 8, wherein the mixture (IV) comprises the lactam (I) in an amount of up to 20% by weight.

10. The process of claim 6, wherein the mixture (IV) comprises the lactam (I) in an amount of up to 20% by weight.

11. The process of claim 6, wherein the wherein the mixture (IV) comprises the lactam (I) in an amount of up to 15% by weight.

12. The process of claim 1, wherein the wherein the mixture (IV) comprises the lactam (I) in an amount of up to 20% by weight.

13. The process of claim 1, wherein the wherein the mixture (IV) comprises the lactam (I) in an amount of up to 15% by weight.

14. The process of claim 1, wherein the mixture (VI) comprises up to 15% by weight of the diamine (II).

15. The process of claim 1, wherein the mixture (VI) comprises up to 10% by weight of the diamine (II).

* * * * *